(12) United States Patent
Sheen et al.

(10) Patent No.: US 7,548,185 B2
(45) Date of Patent: Jun. 16, 2009

(54) INTERLACED LINEAR ARRAY SAMPLING TECHNIQUE FOR ELECTROMAGNETIC WAVE IMAGING

(75) Inventors: David M. Sheen, Richland, WA (US); Douglas L. McMakin, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 11/240,519

(22) Filed: Sep. 30, 2005

(65) Prior Publication Data

US 2007/0075889 A1    Apr. 5, 2007

(51) Int. Cl.
G01S 13/00    (2006.01)
(52) U.S. Cl. .......................................... 342/70; 342/22
(58) Field of Classification Search ................... 342/70, 342/22
See application file for complete search history.

(56) References Cited

U.S. PATENT DOCUMENTS

| | | | |
|---|---|---|---|
| 3,909,827 A | | 9/1975 | Tricoles et al. |
| 5,455,590 A | * | 10/1995 | Collins et al. ................ 342/179 |
| 5,557,283 A | * | 9/1996 | Sheen et al. ................ 342/179 |
| 5,592,180 A | * | 1/1997 | Yokev et al. ................ 342/450 |
| 5,751,243 A | * | 5/1998 | Turpin ......................... 342/179 |
| 6,325,757 B1 | * | 12/2001 | Erikson et al. .............. 600/437 |
| 7,295,146 B2 | * | 11/2007 | McMakin et al. ............. 342/22 |
| 2003/0052169 A1 | * | 3/2003 | Tsikos et al. ................. 235/454 |
| 2004/0140924 A1 | * | 7/2004 | Keller et al. ................... 342/22 |
| 2004/0211894 A1 | * | 10/2004 | Hother et al. ............. 250/269.1 |
| 2004/0263379 A1 | * | 12/2004 | Keller ........................... 342/22 |
| 2005/0227660 A1 | * | 10/2005 | Hashemi et al. .......... 455/276.1 |
| 2005/0285541 A1 | * | 12/2005 | LeChevalier ............. 315/169.3 |
| 2006/0066469 A1 | * | 3/2006 | Foote et al. .................... 342/22 |

FOREIGN PATENT DOCUMENTS

| | | |
|---|---|---|
| EP | 0371133 A1 | 6/1990 |
| EP | 0812005 A2 | 10/1997 |
| EP | 0987561 A2 | 3/2000 |

OTHER PUBLICATIONS

PCT International Search Report and Written Opinion.

* cited by examiner

*Primary Examiner*—Thomas H Tarcza
*Assistant Examiner*—Harry Liu
(74) *Attorney, Agent, or Firm*—Douglas E. McKinley, Jr.

(57) ABSTRACT

An arrangement of receivers and transmitters used in wideband holographic imaging using a reduced number of physical antenna elements compared to established techniques and systems. At least one of the receivers is configured to receive the reflected signal from three or more of transmitters, and at least one transmitter is configured to transmit a signal to an object, the reflection of which will be received by at least three receivers. The improved arrays are easily incorporated into existing microwave and millimeter wave holographic imaging equipment utilizing the existing mechanical features of this equipment, as well as the existing wideband holographic imaging algorithms and electronics for constructing images.

8 Claims, 5 Drawing Sheets

US 7,548,185 B2

INTERLACED LINEAR ARRAY SAMPLING TECHNIQUE FOR ELECTROMAGNETIC WAVE IMAGING

This invention was made with Government support under Contract DE-AC0576RLO 1830, awarded by the U.S. Department of Energy. The Government has certain rights in the invention.

TECHNICAL FIELD

This invention relates to microwave and millimeter wave holographic imaging techniques. Specifically, this invention relates to a method and apparatus that allows millimeter wave holographic imaging equipment to operate with fewer antennas, thereby greatly reducing the cost of these systems with no degradation in system performance.

BACKGROUND OF THE INVENTION

Over the past ten years, the inventors of the present invention have been active in researching, fabricating, and demonstrating millimeter wave holographic imaging techniques. In the course of this effort, they and others have published numerous patents and other publications that describe millimeter wave holographic imaging techniques generally, as well as specific improvements and enhancements. A review of this literature is useful to provide an understanding of the field, and exemplary publications are provided below. Each of these, together with any other patent or publication referenced herein, are hereby incorporated herein in their entirety by this reference.

D. M. Sheen, "Combined illumination cylindrical millimeter-wave imaging technique for concealed weapon detection," *Proceedings of the SPIE—Aerosense 2000: Passive Millimeter-wave Imaging Technology IV*, vol. 4032, 2000.

D. M. Sheen, H. D. Collins, T. E. Hall, D. L. McMakin, R. P. Gribble, R. H. Severtsen, J. M. Prince and L. D. Reid, "Real-time wideband holographic surveillance system." U.S. Pat. No. 5,557,283, 1996.

D. M. Sheen, D. L. McMakin, T. E. Hall, and R. H. Severtsen, "Real-time wideband cylindrical holographic surveillance system." U.S. Pat. No. 5,859,609, 1999.

D. M. Sheen, D. L. McMakin, and T. E. Hall, "Cylindrical millimeter-wave imaging technique for concealed weapon detection," *Proceedings of the SPIE—26th AIPR Workshop: Exploiting new image sources and sensors*, vol. 3240, pp. 242-250, 1997.

D. M. Sheen, D. L. McMakin, H. D. Collins, and T. E. Hall, "Near field millimeter-wave imaging for weapon detection," *Proceedings of the SPIE—Conference on Applications of Signal and Image Processing in Explosive Detection Systems*, vol. 1824, pp. 223-233, 1992.

D. L. McMakin, D. M. Sheen, T. E. Hall, and R. H. Severtsen, "Cylindrical holographic radar camera," *Proceedings of the SPIE—The International Symposium on Enabling Technologies for Law Enforcement and Security*, I. 3575, 1998.

D. L. McMakin, D. M. Sheen, H. D. Collins, T. E. Hall, and R. R. Smith, "Millimeter-wave high resolution holographic surveillance system," *Proceedings of the SPIE EUROPTO International Symposium on Substance Identification Technologies*, vol. 2092, pp. 525-535, 1993.

D. L. McMakin, D. M. Sheen, H. D. Collins, T. E. Hall, and R. H. Severtsen, "Wideband, millimeter-wave, holographic weapons surveillance system," *Proceedings of the SPIE—EUROPTO European symposium on optics for environmental and public safety*, vol. 2511, pp. 131-141, 1995.

D. L. McMakin, D. M. Sheen, and H. D. Collins, "Remote concealed weapons and explosive detection on people using millimeter-wave holography," presented at 1996 IEEE International Carnahan Conference on Security Technology, 1996.

D. L. McMakin and D. M. Sheen, "Millimeter-wave high-resolution holographic surveillance systems," presented at AAAE Airport Security Technology Conference, Atlantic City, N.J., 1994.

D. L. McMakin, R. H. Severtsen, T. E. Hall, and D. M. Sheen, "Interrogation of an object for dimensional and topographical information." U.S. Pat. No. 6,703,964 B2.

Many of the near real-time imaging systems described in the aforementioned publications use linear arrays of microwave/millimeter wave antennas that are sequentially switched electronically to allow high-speed sampling along the array axis. Mechanical scanning, in a direction perpendicular to the array axis, then completes the sampling of a two dimensional aperture of wideband holographic image data. This data can then be reconstructed using wideband holographic imaging algorithms, typically using a computer configured to automate the process, resulting in a focused image.

A preferred wideband holographic imaging technique is described in detail in D. M. Sheen, D. L. McMakin, and T. E. Hall, "Three-dimensional millimeter-wave imaging for concealed weapon detection," *IEEE Transactions on Microwave Theory and Techniques*, vol. 49, pp. 1581-92, 2001. A similar scanning technique can be employed in a cylindrical fashion using a linear array that is scanned over a circular path around the target to be imaged.

In these and other configurations, a major cost of these systems is the array of antennas. The most direct and obvious method of scanning along the array axis is to assume that each antenna is placed uniformly along the axis of the linear array, and can function simultaneously as a transmitter and receiver. This scenario is depicted in FIG. 1.

A switching network is used to sequentially select each antenna element and then use it to transmit and receive the wideband microwave/millimeter-wave signal. An antenna spacing of $\Delta$ results in an effective spatial sample spacing of $\Delta$. While conceptually simple, this technique has a number of drawbacks. First, the antennas must be spaced very closely, usually on the order of one-half wavelength at the center frequency in order to satisfy the spatial sampling criterion on the aperture. This forces the antenna to be very small, and therefore low-gain, and will frequently cause antenna coupling problems between adjacent or neighboring antennas.

An additional problem is that the microwave/millimeter-wave transceiver must be capable of separating the transmit from the receive signal. This is possible using directional couplers or circulators, however, these introduce additional losses and do not perfectly isolate the weaker received signal from the much stronger transmitted signal.

Accordingly, there exists a need for improved methods and apparatus for wideband holographic imaging that minimizes the cost of these systems.

SUMMARY OF THE INVENTION

It is therefore an object of this invention to provide a method and apparatus for wideband holographic imaging that scans along the axis of the array using a reduced number of physical antenna elements compared to established techniques. It is a further object of this invention to provide a method and apparatus for wideband holographic imaging that scans along the axis of the array using a reduced number of physical antenna elements compared to established techniques with little or no loss in the resolution of the resultant image. It is yet another object of the present invention to provide arrays of transmitting and receiving antennas that can readily be incorporated into prior art microwave and millimeter wave holographic imaging equipment that utilize fewer total elements, yet range over an equally large aperture, thus allowing the fabrication of this equipment at a lowered cost with no penalty in performance.

These and other objects of the present invention are accomplished by providing an apparatus for synthetic imaging using electromagnetic waves that utilizes a linear array of transmitters configured to transmit electromagnetic radiation between the frequency of 200 MHz and 1 THz, and a linear array of receivers configured to receive the reflected signal from said transmitters. When compared with the prior art, the present invention minimizes the total number of receivers and transmitters required to make an image of a given resolution because at least one of the receivers is configured to receive the reflected signal from three or more transmitters, and at least one transmitter is configured to transmit a signal to an object, the reflection of which will be received by at least three receivers. These improved arrays are easily incorporated into existing microwave and millimeter wave holographic imaging equipment utilizing the existing mechanical features of this equipment, as well as the existing wideband holographic imaging algorithms and electronics for reconstructing images, including computer systems configured to automate the process.

As will readily be recognized by those having ordinary skill in the art and the benefit of this disclosure, the arrangement of the receivers and the transmitters is interchangeable; meaning that the benefits of the present invention can also be achieved if the receivers of the invention are replaced with the transmitters, and the transmitters with receivers.

As will be shown in the detailed description of the present invention set forth below, numerous configurations of receivers and transmitters fulfilling the requirement that at least one transmitter is configured to transmit a signal to three or more receivers and at least one receiver is configured to receive a signal from three or more transmitters, are possible. All of these configurations, however, have the same benefit; a reduction in the total number of elements (an "element" referring to both transmitters and receivers) required to produce a holographic image of substantially equal resolution when compared to a linear array having an equal number of transmitters and receivers.

BRIEF DESCRIPTION OF THE DRAWINGS

The following detailed description of the embodiments of the invention will be more readily understood when taken in conjunction with the following drawing, wherein.

DETAILED DESCRIPTION OF THE PREFERRED EMBODIMENTS

For the purposes of promoting an understanding of the principles of the invention, FIGS. 2 through 5 show various configurations of sampling systems utilizing linear arrays. As will be recognized by those having ordinary skill in the art, the figures show what would typically only be a portion of the arrays used in actual systems, as in many applications the size of the object imaged by these systems necessitates much longer arrays. Accordingly, the examples shown in FIGS. 2 through 5 are only intended to be illustrative of the general principles with respect to how various elements within the arrays may be used to achieve the advantages of the present invention, and the invention should in no way be limited to either the number of elements shown in these illustrative examples, or the arrangement of these elements within these illustrative examples.

For example, and not meant to be limiting, those having ordinary skill in the art and the benefit of this disclosure will readily recognize that arrays with far more elements than are shown in the Figures are enabled by the general principles taught in this description, because the patterns shown in the examples can be repeated multiple times. Further, those having ordinary skill in the art and the benefit of this disclosure will readily recognize that geometries differing from the illustrative examples of this disclosure, yet still utilizing the concept of creating more virtual sampling points than elements, are enabled by the general principles taught in this description. Accordingly, embodiments utilizing the principles taught in this description are expressly contemplated by the inventors, and no limitations except those expressly set forth in the appended claims should be inferred by the specifics of the illustrative examples set forth herein.

Figure 2:
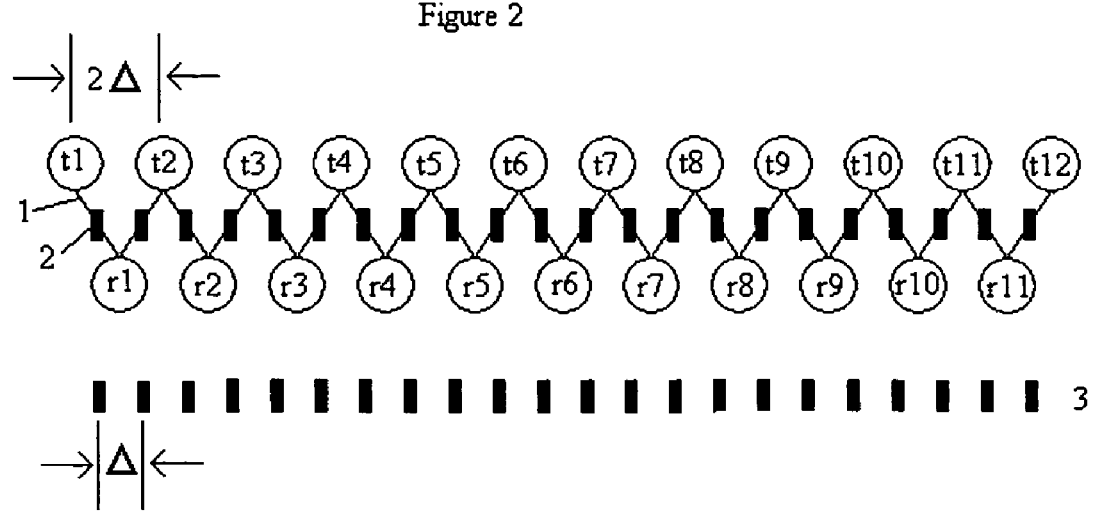
FIG. 2 shows the spatial orientation of virtual sampling points between an array of receivers in communication with an array of transmitters.

In FIG. 2, one array is dedicated as a transmit array, and the other array is dedicated as a receive array. As shown in FIG. 2, the transmit and receive arrays have an element spacing of $2\Delta$ and are offset from each other by distance $\Delta$. As further shown in FIG. 2, each transmitter, t1, t2, t3, t4, and t5 is separated from two receivers by the distance of angled line 1 (except for transmitters t1, which is separated from only one receiver as a result of its being on the end of the array).

When electromagnetic radiation from each transmitter is reflected from an object being sampled, each receiver then receives the reflected signal. Each transmit and receive antenna pair thus approximates a sample at the spatial point located half-way between the phase centers of each antenna, hereinafter referred to as the "virtual sampling point" 2.

Figure 3:
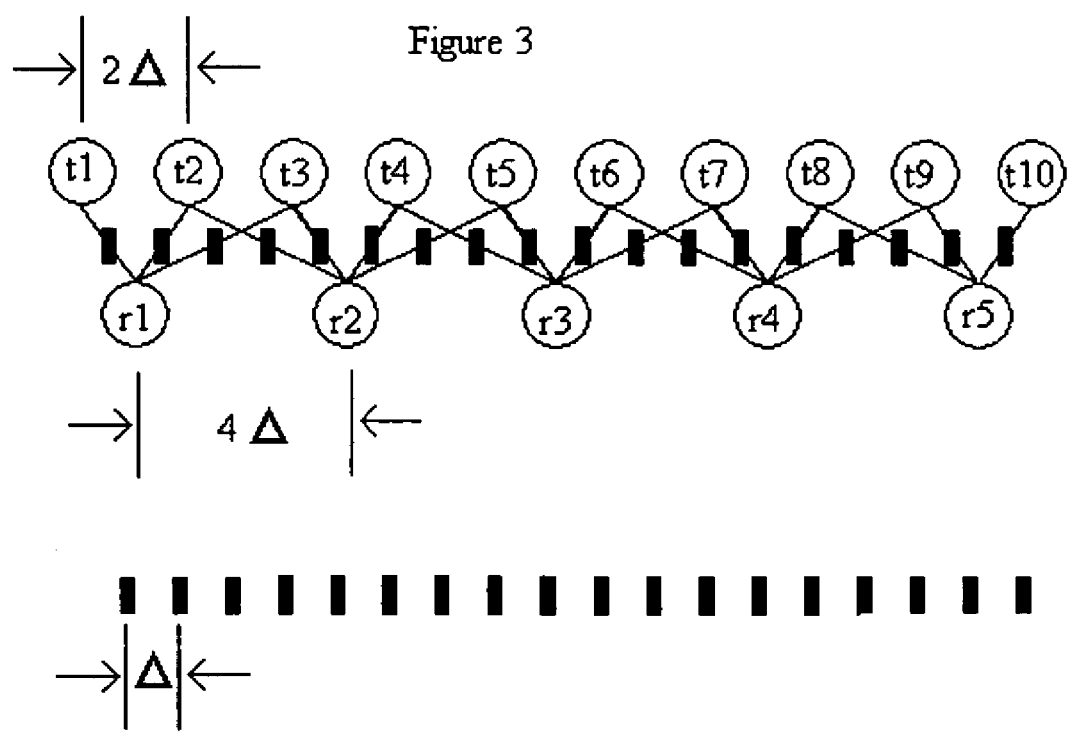
FIG. 3 shows the spatial orientation of virtual sampling points between of an array of receivers in communication with an array of transmitters, wherein each of the receivers is in communication with four different transmitters and each transmitter is in communication with two receivers.
Figure 4:
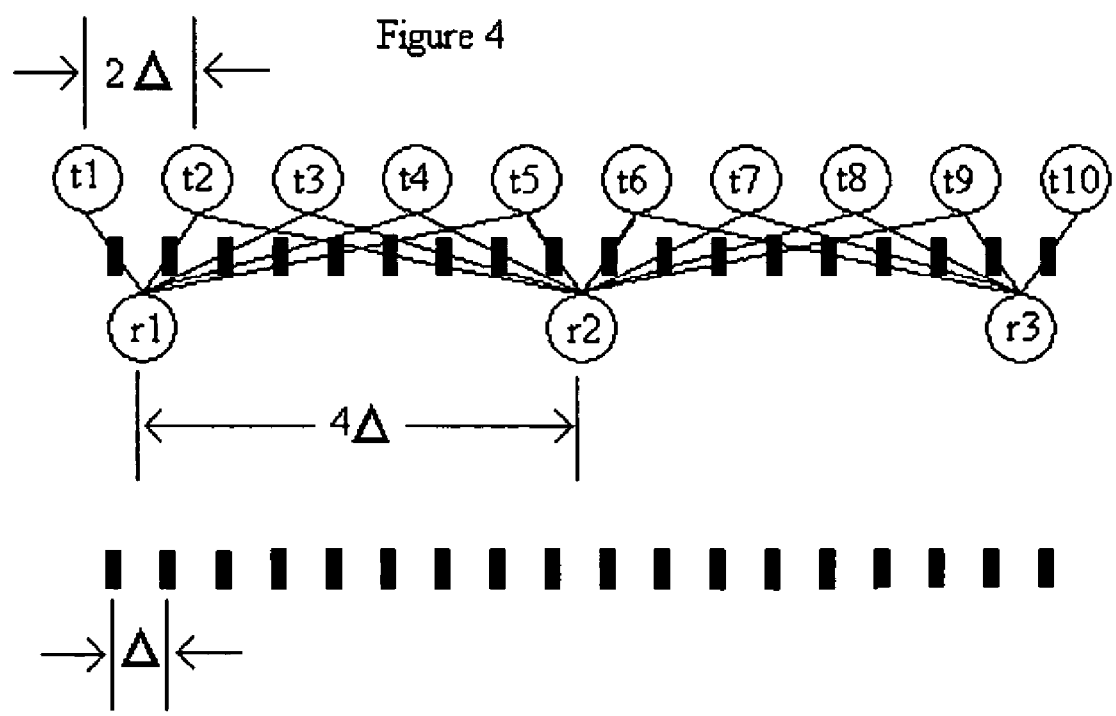
FIG. 4 shows the spatial orientation of virtual sampling points between an array of receivers in communication with an array of transmitters, wherein each of the receivers is in communication with eight different transmitters and each transmitter is in communication with two receivers.

As shown in FIG. 2, the virtual sampling points for these transmitter and receiver arrays are equidistant from each transmitter to each receiver, and is shown at the midpoint of line 1 connecting the transmitters (t1, t2, t3, t4, t5, etc.) with the receivers (r1, r2, r3, r4, r5, etc.) by the thick vertical line at the location of the virtual sampling point 2. The spacing of the virtual sampling points for the each configuration in FIGS. 2 through 4 are also shown below the arrays by the series of dashes 3, where $\Delta$ is the distance between virtual sampling points. As will be recognized by those having ordinary skill in the art and the benefit of this disclosure, this approximation of the virtual sampling points is valid assuming that the transmit-receive antenna spacing is sufficiently less than the distance to the object that is being imaged.

The array shown in FIG. 2 is sequentially sampled by switching on the first transmit antenna t1, and the first receive antenna r1, and collecting the first spatial sample. The second transmit antenna t2 can then be switched on and the second sample collected (with the first receive antenna r1 still switched on). The second receive antenna r2 is then switched on (with the second transmit antenna t2 still on) to collect the third spatial sample. This process is then continued across the array.

Figure 1:
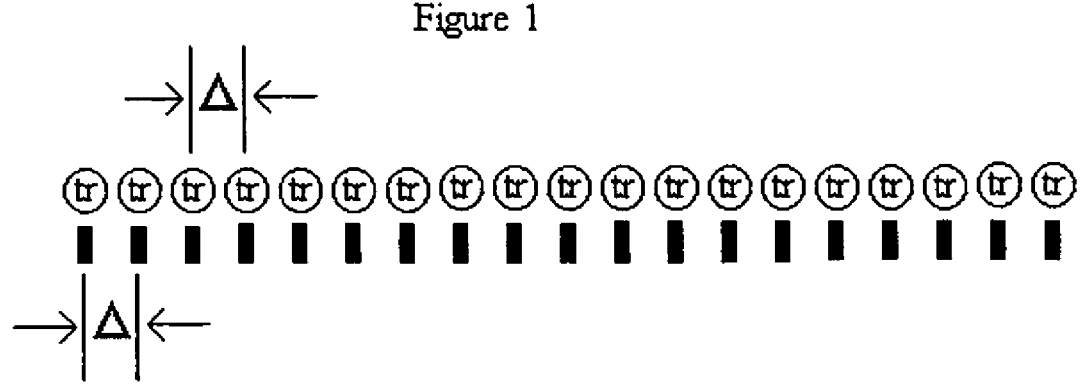
FIG. 1 shows the spatial orientation of an array of antenna using each element as both a receiver and a transmitter.

This configuration has a number of advantages over the configuration shown in FIG. 1. Antenna are dedicated to be either transmitters or receivers, so no duplexing is required in the transceiver. Antenna spacing of 2Δ results in an effective sample spacing of Δ. This allows for larger antenna to be utilized and reduces the coupling between the antenna. However, when operated in this manner, the array of transmitters and receivers approximates an array of antennas having each placed at the virtual sampling points, and with each functioning simultaneously as a transmitter and receiver, as depicted in FIG. 1. Thus, as shown in FIG. 2, this particular arrangement of transmitters and receivers results in a 1:1 ratio of elements to sampling points, and does not, therefore, result in a reduction of the total number of elements.

While the sampling technique described above and shown in FIG. 2 is effective, it is desirable to reduce the number of antenna elements required to sample a given width/height of the aperture. The number of samples needed is determined by Nyquist sampling requirements, however, the number of antenna elements can be reduced using receivers in combination with three or more transmitters, receivers in combination with three or more transmitters, or both. In this manner, the total number of virtual sampling points can be held constant while the number of elements is reduced.

FIG. 3 illustrates the concept. The array of receivers and transmitters is the same as is shown in FIG. 2, except that the receive array has been thinned by removing every other receive antenna element. As with FIG. 2, the angled lines show the distance between each receiver and transmitter, and the horizontal lines show the virtual sample points. Each receiver is now used in conjunction with four nearest transmit antenna elements, and scanning proceeds in a manner analogous to that described for FIG. 2.

This results in the same effective sample spacing and density as in the conventional separate transmit and receive array sampling technique described in FIG. 2, however the number of receive elements has been reduced by approximately one-half. Therefore collection of N spatial samples would require approximately 3N/4 physical antenna elements. Note that this technique would work equally well with the transmit array thinned, rather than the receive array.

This technique can be extended by further reducing the number of receive elements by again removing half of the receivers, as shown in FIG. 4. In this configuration, each receive antenna element is used in conjunction with the eight nearest transmitters, as shown in FIG. 4. Again, the scanning proceeds in a manner analogous to that described for FIG. 2.

This thinning process shown in FIGS. 3 and 4 could be continued to the extreme case where the only receiver elements remaining are the ones located near the ends of the linear array. However, as this extreme configuration embodiment is approached, the resolution of the image would tend to degrade, due to the abrupt jump in illumination from the left side of the array to the right side of the array, and because the separation between the transmit and receive antennas would begin to approach the distance to the imaging target.

Figure 5:
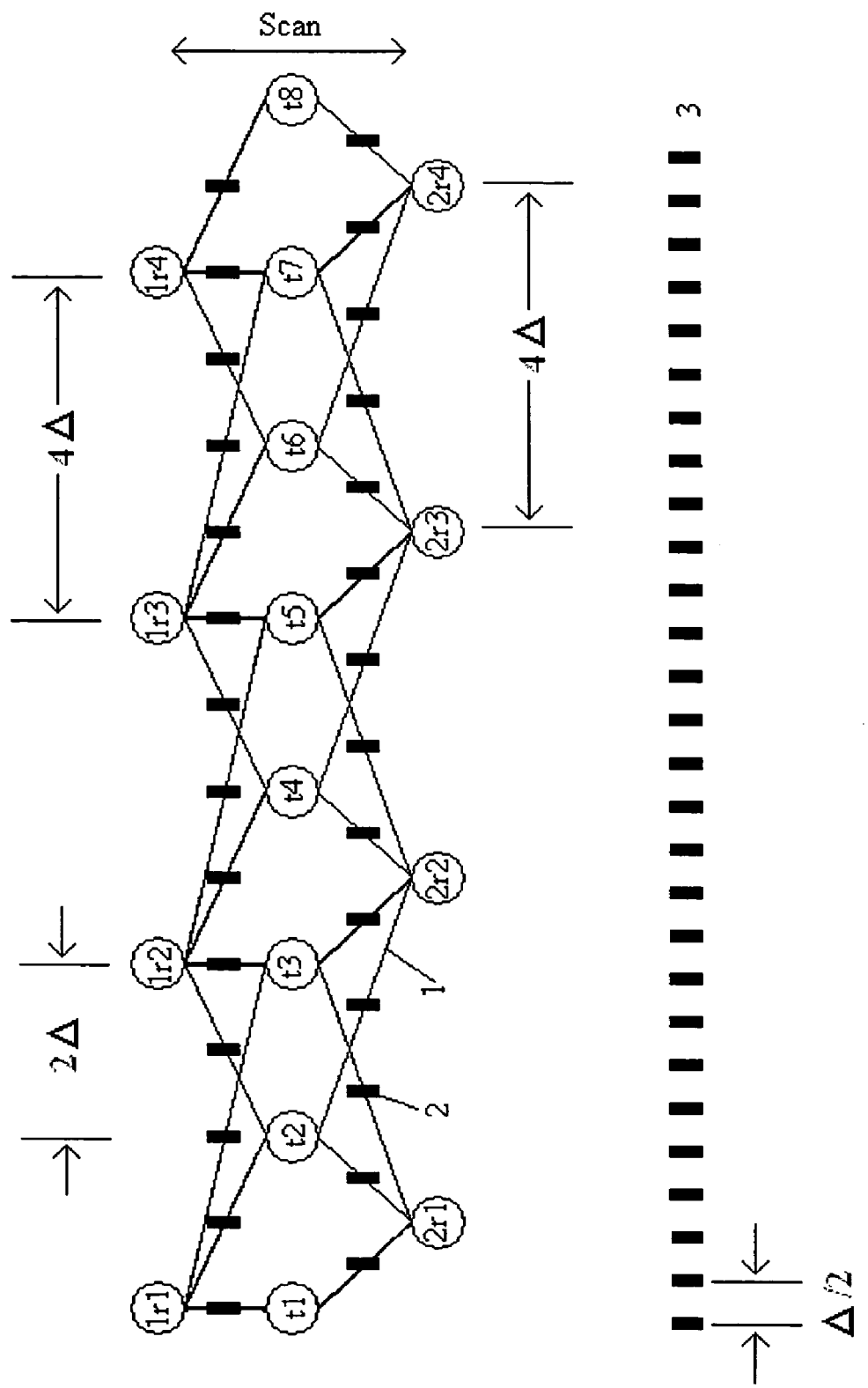
FIG. 5 shows the spatial orientation of virtual sampling points between two arrays of receivers in communication with an array of transmitters, wherein each of the receivers is in communication with four different transmitters, and each transmitter is in communication with four different receivers an example of one possible configuration of the present invention.

More preferred than either of the embodiments shown in FIG. 3 or 4 is an interlaced sampling linear array sampling technique. This configuration uses a single transmit array consisting of four antennas t1, t2, t3, and t4, a first receive array consisting of four receivers 1r1, 1r2, 1r3 and 1r4 and a second receive array, consisting of four additional receivers 2r1, 2r2, 2r3 and 2r4, as shown in FIG. 5. In this embodiment, each transmit antenna is used in conjunction with the four nearest receivers, two from the first receive array and two from the second receive array. For example, as shown in FIG. 5, transmit antenna t2 forms two virtual sampling points with receive antenna 1r1 and 1r2 from the first array, and forms two virtual sampling points with receive antenna 2r1 and 2r2 from the second array.

Notably, while FIG. 5 shows the transmit array juxtaposed between the upper array and the lower array, such is not necessarily required. The two arrays of receivers could be co-linear with one and another, although this geometry is not preferred due to increased potential for interference between closely spaced receivers. Also, as noted previously, the receiver and transmitters can be reversed, such that two arrays of transmitters and one array of receivers could be used.

Sampling using the transmit array and the receive arrays results in the samples at the virtual sampling points again shown as the short thick lines 2. As shown in FIG. 5, that the virtual sample points from the first array of receivers 1r1, 1r2, 1r3 and 1r4 and the second array 2r1, 2r2, 2r3 and 2r4 are offset laterally from each other by Δ/2, and vertically by an amount equal to the vertical spacing of each from the transmit array (shown as distance D in FIG. 5).

The arrays of the present invention are designed to be easily incorporated into the types of linear mechanical scans used in existing microwave and millimeter wave holographic imaging systems. Thus, whether scanning with a rectilinear or cylindrical aperture, the offset between the virtual sampling points can be made to align at slightly offset times during the mechanical scan. For example, the transmit array t1, t2, t3, and t4 can be sequenced using the first receive array 1r1, 1r2, 1r3 and 1r4 to collect the virtual sample points 2 between the first receive array 1r1, 1r2, 1r3 and 1r4 and the transmit array t1, t2, t3, and t4 in a sequential manner analogous to the scanning of the array described for FIG. 2. Then, when the array has moved upward a distance D in the plane of the two sided arrow labeled "scan," the transmit array 1r1, 1r2, 1r3 and 1r4 can be sequenced using the second receive array 2r1, 2r2, 2r3 and 2r4 to collect the virtual sample points 2 between the second receive array 2r1, 2r2, 2r3 and 2r4 and the transmit array t1, t2, t3, and t4 in the same manner as the first receive array. The net effect of the two successive scans is that the spacing of the combined virtual sampling points is Δ/2, as shown by the series of dashes 3 below the arrays.

Thus, the present invention provides an overwhelming advantage because the collection of N spatial samples requires only approximately N/2 physical antenna elements. This reduces the number of antennas required by approximately one-half compared with the technique described in FIGS. 1 and 2, and up to one-third compared to the techniques described in FIGS. 3 and 4.

An additional advantage is that the physical separation of the antennas is larger for a given effective sample spacing, which will allow greater antenna gain and/or greater isolation between antennas. Further, the first receive array 1r1, 1r2, 1r3 and 1r4 and the second receive array 2r1, 2r2, 2r3 and 2r4 could also be thinned in a manner identical to that shown in FIGS. 3 and 4 to further reduce the number of antenna elements required.

While the invention has been shown and described in connection with these illustrative examples, it will be apparent to those skilled in the art that many changes and modifications may be made without departing from the invention in its broader aspects. The appended claims are therefore intended to cover all such changes and modifications as fall within the true spirit and scope of the invention.

The invention claimed is:

1. An apparatus for synthetic imaging using electromagnetic waves comprising:
    a. a linear array of transmitters configured to transmit electromagnetic radiation between the frequency of 200 MHz and 1 THz, and
    b. a linear array of receivers each configured to receive a plurality of reflected signals from said transmitters, wherein at least one of said receivers is configured to receive the reflected signal originated from three or more of said transmitters, and at least one of said transmitters is configured to transmit a signal, the reflection of which is received by 3 or more of said receivers, such that at least one transmitter is configured to generate at least two virtual sampling points.

2. An apparatus for synthetic imaging using electromagnetic waves comprising:
    a. two linear arrays of transmitters configured to transmit electromagnetic radiation between the frequency of 200 MHz and 1 THz, wherein at least one of said transmitters in each array transmits a signal, the reflection of which is received by three or more receivers and generate at least two virtual sampling points,
    b. a linear array of receivers each configured to receive the reflected signal originated from said transmitters.

3. An apparatus for synthetic imaging using electromagnetic waves comprising:
    a. a linear array of transmitters configured to transmit electromagnetic radiation between the frequency of 200 MHz and 1 THz,
    b. two linear arrays of receivers, wherein at least one receiver in each array is configured to receive the reflected signal originated from three or more of said transmitters and generate at least two virtual sampling points.

4. A method for producing an image of an object using electromagnetic waves comprising the steps of:
    a. providing a linear array of transmitters each configured to transmit a signal to an object, wherein at least one of said transmitters is configured to transmit a reflection of a signal from said object to three or more receivers and to generate at least two virtual sampling points,
    b. transmitting a series of signals of electromagnetic radiation between the frequency of 200 MHz and 1 THz from said linear array of transmitters to said object,
    c. providing a linear array of receivers configured to receive the reflected signal from said object, wherein at least one of said receivers is configured to receive the reflected signal from originated from three or more of said transmitters,
    d. receiving the reflection of said signals by said linear array of receivers, and
    e. digitally processing said reflected signals in a processor to create a digital image of said object.

5. A method for producing an image of an object using electromagnetic waves comprising the steps of:
    a. providing a first and a second linear array of transmitters, each configured to transmit a signal to an object,
    b. transmitting a first series of signals of electromagnetic radiation between the frequency of 200 MHz and 1 THz from said first linear array of transmitters to an object thereby generating at least two virtual sampling points,
    c. providing a linear array of receivers configured to receive the reflection of said first series of signals from said object, wherein at least one of said receivers is configured to receive the reflected signal from three or more of said first array of transmitters,
    d. receiving the reflection of said first series of signals reflected from said object by said receivers,
    e. transmitting a second series of signals of electromagnetic radiation between the frequency of 200 MHz and 1 THz from said second linear array of transmitters to an object thereby generating at least two virtual sampling points,
    f. receiving the reflection of said second series of signals reflected from said object by said receivers,
    g. processing said first and second series of reflected signals received by said receivers in a processor to create an image of said object.

6. The method of claim 5 wherein the first linear array of transmitters, the second linear array of transmitters, and the linear array of receivers are shifted between the step of transmitting the first series of signals and the step of transmitting the second series of signals such that at least one virtual sampling point of the first series of signals is aligned with a virtual sampling point of the second series of signals.

7. A method for producing an image of an object using electromagnetic waves comprising the steps of:
    a. providing a linear array of transmitters, each transmitter configured to transmit a signal to an object, the reflection of said signal to be received by at least three receivers in each of a first linear array of receivers and a second linear array of receivers,
    b. providing a first and a second linear array of receivers, each configured to receive a signal reflected by said object,
    c. transmitting a first series of signals of electromagnetic radiation between the frequency of 200 MHz and 1 THz from said linear array of transmitters to said object thereby generating at least two virtual sampling points,
    d. receiving the reflection of said first series of signals reflected from said object by said first linear array of receivers,
    e. transmitting a second series of signals of electromagnetic radiation between the frequency of 200 MHz and 1 THz from said linear array of transmitters to said object,
    f. receiving the reflection of each of said second series of signals reflected from said object by said second linear array of receivers,
    g. processing said first and second series of reflected signals received by said receivers in a processor to create an image of said object.

8. The method of claim 7 wherein the first linear array of receivers, the second linear array of receivers, and the linear array of transmitters are shifted between the step of transmitting the first series of signals and the step of transmitting the second series of signals such that at least one virtual sampling point of the first series of signals is aligned with a virtual sampling point of the second series of signals.

* * * * *